(12) United States Patent
Beyerl

(10) Patent No.: US 11,699,940 B2
(45) Date of Patent: Jul. 11, 2023

(54) STATOR WITH CARBON FIBER-BASED INSULATION STRIPS

(71) Applicant: MILWAUKEE ELECTRIC TOOL CORPORATION, Brookfield, WI (US)

(72) Inventor: Andrew Beyerl, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 108 days.

(21) Appl. No.: 17/096,452

(22) Filed: Nov. 12, 2020

(65) Prior Publication Data

US 2021/0159762 A1   May 27, 2021

Related U.S. Application Data

(60) Provisional application No. 62/941,266, filed on Nov. 27, 2019.

(51) Int. Cl.
*H02K 3/34* (2006.01)
*H02K 9/22* (2006.01)
(Continued)

(52) U.S. Cl.
CPC .............. *H02K 9/223* (2021.01); *H02K 1/146* (2013.01); *H02K 3/325* (2013.01)

(58) Field of Classification Search
CPC ........ H02K 9/223; H02K 1/146; H02K 1/185; H02K 1/04; H02K 3/325; H02K 3/34; H02K 3/345
(Continued)

(56) References Cited

U.S. PATENT DOCUMENTS

| | | |
|---|---|---|
| 5,319,276 A | 6/1994 | Schuler |
| 2007/0222323 A1* | 9/2007 | Neet ................. H02K 3/345 |
| | | 310/215 |

(Continued)

FOREIGN PATENT DOCUMENTS

| | | | |
|---|---|---|---|
| CN | 104682587 B | | 9/2018 |
| JP | 2006141130 A | * | 6/2006 |

(Continued)

OTHER PUBLICATIONS

Machine translation of JP-2006141130-A. (Year: 2006).*

(Continued)

*Primary Examiner* — Michael Andrews
(74) *Attorney, Agent, or Firm* — Michael Best & Friedrich LLP

(57) ABSTRACT

A stator includes a stator core having an annular portion and a plurality of teeth extending radially inward from the annular portion, such that a slot is defined between each pair of adjacent teeth. Each of the teeth includes a pair of side surfaces that face in opposite directions. The stator core also includes a plurality of inner surfaces on the annular portion, each inner surface arranged between facing side surfaces of two adjacent teeth of the plurality of teeth. The stator also includes a plurality of thermally conductive, carbon fiber-based insulation strips. Each insulation strip is arranged within one of the slots for covering the inner surface and the facing side surfaces of two adjacent teeth. The stator also includes a plurality of windings wound around the respective teeth.

42 Claims, 5 Drawing Sheets

(51) Int. Cl.
  *H02K 3/32*    (2006.01)
  *H02K 1/14*    (2006.01)
(58) Field of Classification Search
  USPC .................................................. 310/64, 215
  See application file for complete search history.

(56) References Cited

U.S. PATENT DOCUMENTS

| | | | |
|---|---|---|---|
| 2012/0080976 A1* | 4/2012 | Oka | H02K 3/522 |
| | | | 310/215 |
| 2014/0015358 A1* | 1/2014 | Wan | H02K 3/522 |
| | | | 310/198 |
| 2015/0171693 A1* | 6/2015 | Sakaue | H02K 3/04 |
| | | | 310/215 |

FOREIGN PATENT DOCUMENTS

| | | | |
|---|---|---|---|
| JP | 2006141130 A | | 6/2006 |
| KR | 1020170046077 A | | 4/2017 |

OTHER PUBLICATIONS

Yahoo Finance, "KULR Technology to Collaborate with Global Tier-1 Power Tool Manufacturer for New Line of Performance Products," <https://www.finance.yahoo.com/news/kulr-technology-collaborate-global-tier-160644426.html> article published Nov. 14, 2019 (1 page).
International Search Report and Written Opinion for Application No. PCT/US2020/060215 dated Mar. 5, 2021 (12 pages).

\* cited by examiner

STATOR WITH CARBON FIBER-BASED INSULATION STRIPS

CROSS-REFERENCE TO RELATED APPLICATIONS

This application claims priority to U.S. Provisional Patent Application No. 62/941,266 filed on Nov. 27, 2019, the entire content of which is incorporated herein by reference.

FIELD OF THE INVENTION

The present invention relates to electric motors, and more particularly to stators for use in electric motors.

BACKGROUND OF THE INVENTION

Brushless electric motors include a stator, which is typically held stationary within a housing, and a rotor extending through the stator. In operation, electrical current is directed through multiple windings of the stator to create a rotating magnetic field, applying torque to the rotor causing it to rotate relative to the stator. The electrical resistance of the windings results in energy losses in the form of heat, which can negatively affect long-term performance of the motor.

SUMMARY OF THE INVENTION

The invention provides, in one aspect, a stator comprising a stator core including an annular portion and a plurality of teeth extending radially inward from the annular portion, such that a slot is defined between each pair of adjacent teeth. Each of the teeth includes a pair of side surfaces that face in opposite directions. The stator core also includes a plurality of inner surfaces on the annular portion, each inner surface arranged between facing side surfaces of two adjacent teeth of the plurality of teeth. The stator also comprises a plurality of thermally conductive, carbon fiber-based insulation strips. Each insulation strip is arranged within one of the slots for covering the inner surface and the facing side surfaces of two adjacent teeth. The stator further comprises a plurality of windings wound around the respective teeth.

The invention provides, in another aspect, a stator comprising a stator coil including an annular portion and a first tooth extending radially inward from the annular portion. The first tooth includes a first side surface. The stator core further comprises a second tooth extending radially inward from the annular portion. The second tooth includes a second side surface, such that a slot is defined between the first and second teeth. The stator core also includes an inner surface arranged on the annular portion between the first and second side surfaces. The stator further comprises a thermally conductive, carbon fiber-based insulation strip within the slot for covering the inner surface, the first side surface, and the second side surface. The stator further comprises a first winding wound around the first tooth and a second winding wound around the second tooth.

The invention provides, in yet another aspect, a stator comprising a stator core including an annular portion and a first tooth extending radially inward from the annular portion. The first tooth includes a first side surface, a first end surface, and a second end surface opposite the first end surface. The stator core also includes a second tooth extending radially inward from the annular portion. The second tooth includes a second side surface facing the first side surface of the first tooth, a third side surface facing an opposite direction as the second side surface, a first end surface, and a second end surface opposite the first end surface. The stator core also includes a third tooth extending radially inward from the annular portion. The third tooth includes a fourth side surface facing the third side surface of the second tooth, a first end surface, and a second end surface opposite the first end surface. The stator core also includes comprises a first inner surface arranged on the annular portion between the first and second side surfaces and a second inner surface arranged on the annular portion between the third and fourth side surfaces. The stator further comprises a first thermally conductive, carbon fiber-based insulation strip covering the first side surface, the first inner surface, and the second side surface, a second thermally conductive, carbon fiber-based insulation strip covering the third side surface, the second inner surface, and the fourth side surface, a first insulation end cap configured to cover the first end surface of each of the first, second, and third teeth, a second insulation end cap configured to cover the second end surface of each of the first, second, and third teeth, and a winding wound around the second tooth. The winding contacts the first insulation strip, the first insulation end cap, the second insulation strip, and the second insulation end cap, such that the winding does not contact the second side surface, the first end surface of the second tooth, the third side surface, or the second end surface of the second tooth.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
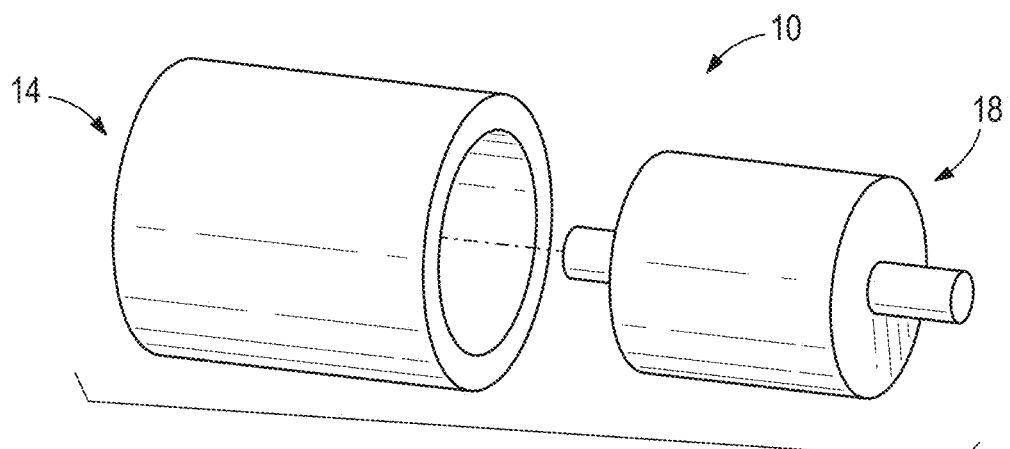
FIG. 1 is an exploded, schematic view of an electric motor.

FIG. 1 schematically illustrates a brushless direct current (DC) electric motor 10 for use in a power tool, for example. The motor 10 includes a stator 14 and a rotor 18. In operation, electrical current is directed through multiple windings of the stator 14 to create a rotating magnetic field, applying torque to the rotor 18 causing it to rotate relative to the stator 14.

Figure 2:
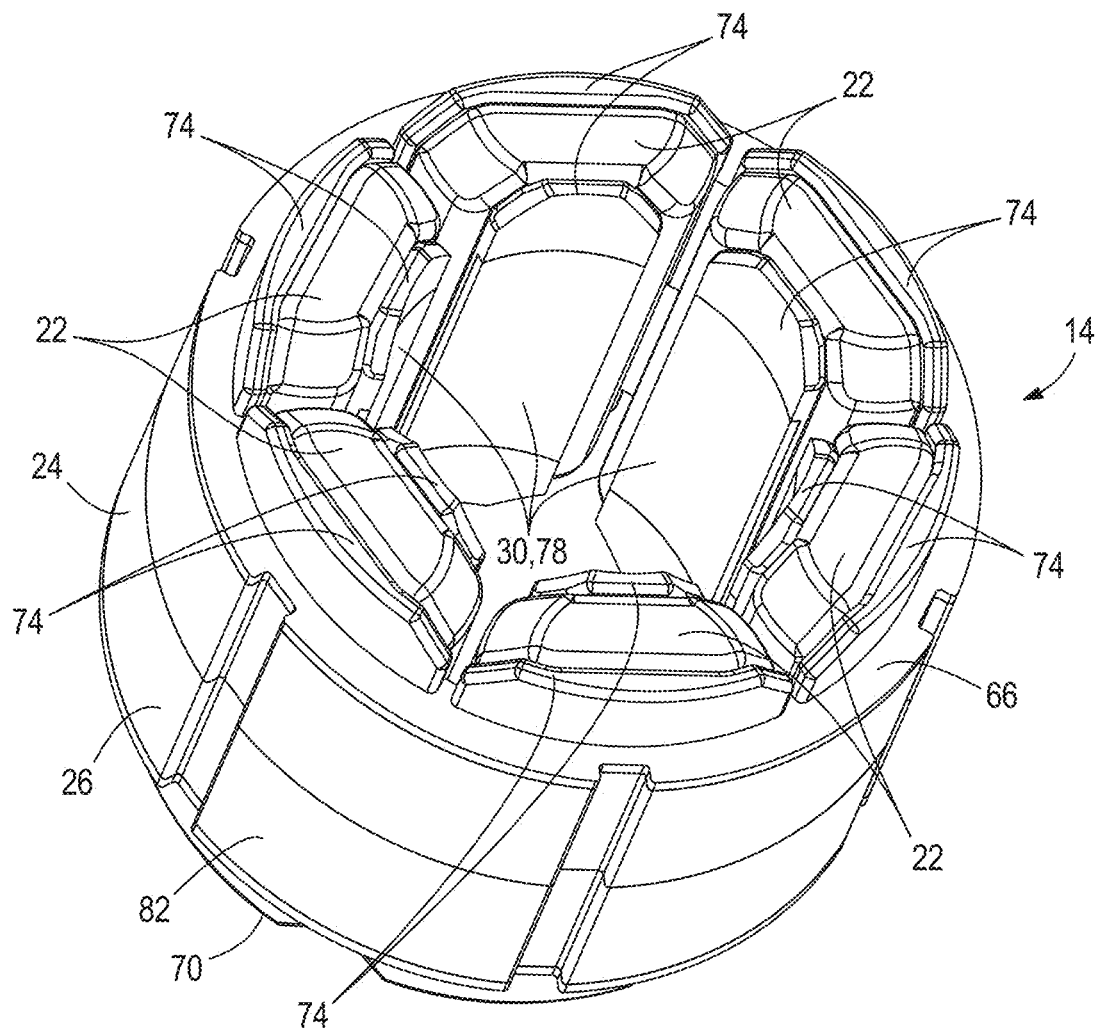
FIG. 2 is a perspective view a stator of the electric motor of FIG. 1.
Figure 3:
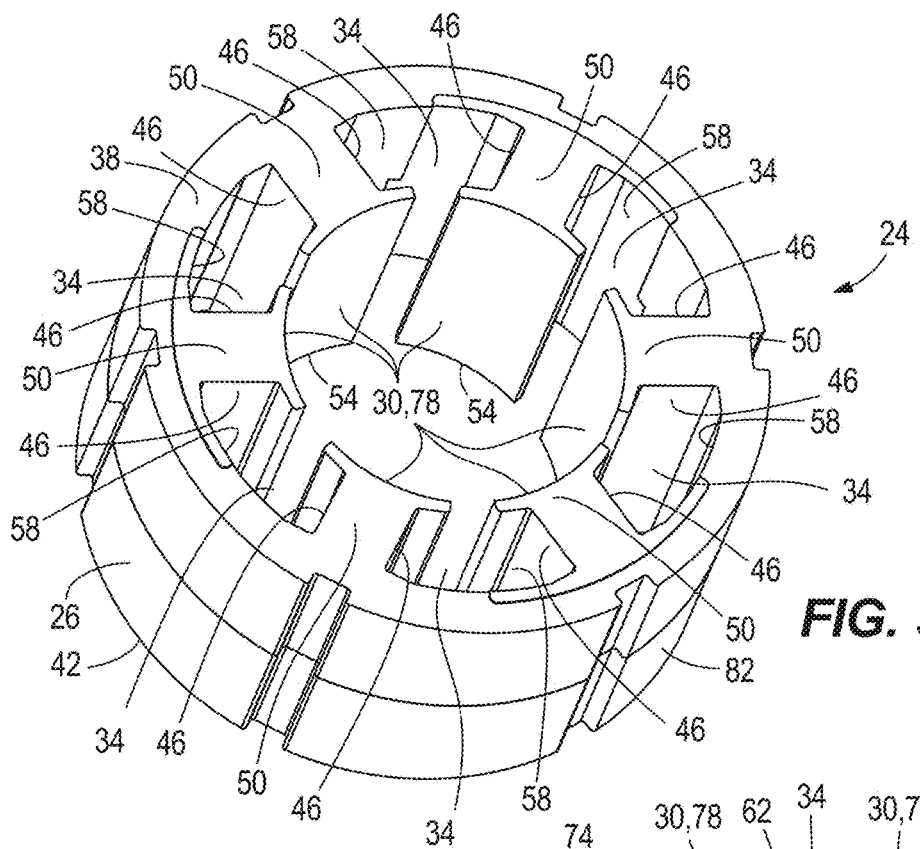
FIG. 3 is a perspective view of a stator core of the stator of FIG. 2.

As shown in FIGS. 2 and 3, the stator 14 includes a stator core 24 having an annular portion 26 and a plurality of teeth 30 extending radially inward from the annular portion 26, such that a slot 34 is defined between each pair of adjacent teeth 30. As shown in FIG. 3, the annular portion 26 has a first end face 38 and an opposite second end face 42. Each tooth 30 has a pair of side surfaces 46 that face in opposite directions, a first end surface 50, and an opposite, second end surface 54. The annular portion 26 also includes a plurality of inner surfaces 58, with each inner surface 58 arranged between the facing side surfaces 46 of two adjacent teeth 30. Thus, each slot 34 is defined by the space bounded by an inner surface 58 of the annular portion 26 and the side surfaces 46 of two adjacent teeth 30.

Figure 4:
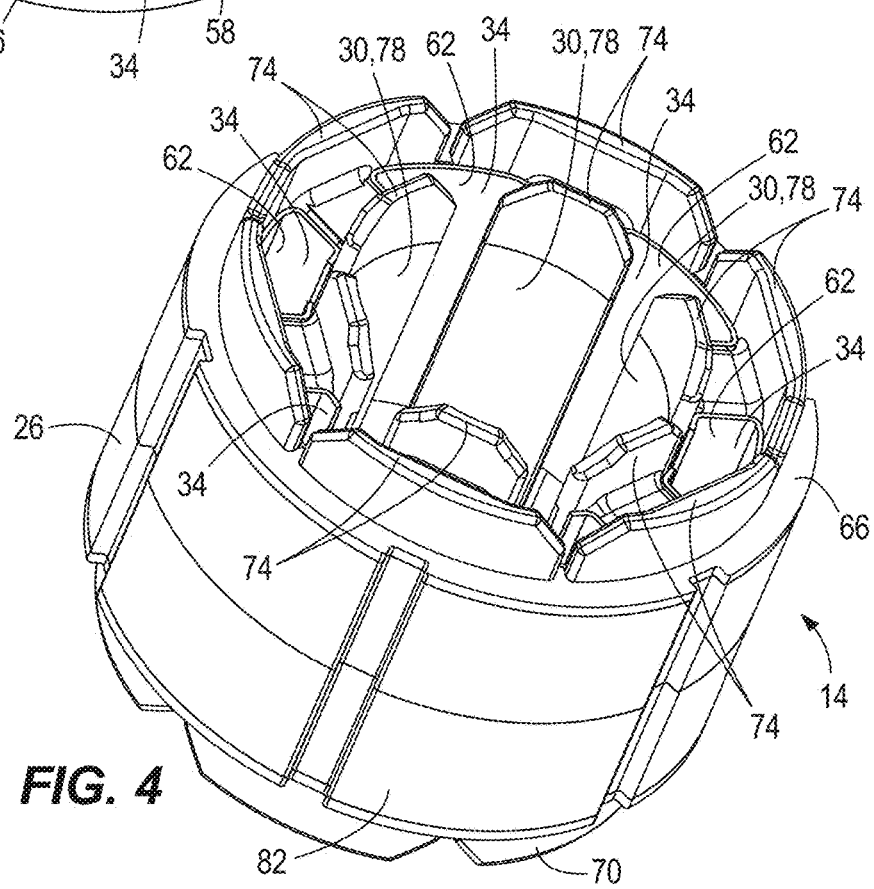
FIG. 4 is a perspective view of the stator of FIG. 2, with windings removed.
Figure 5:
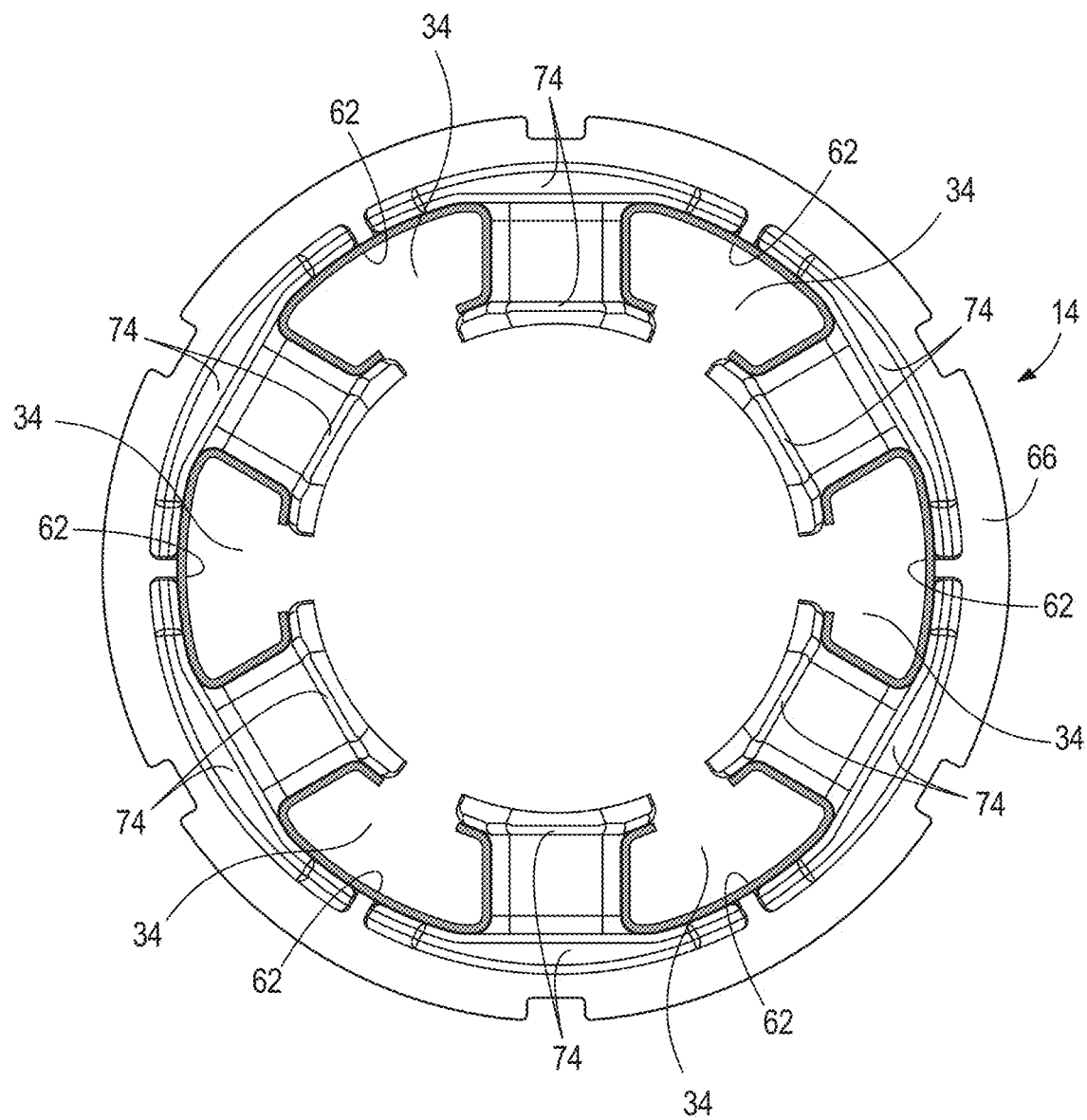
FIG. 5 is a plan view of the stator of FIG. 2, with windings removed.

With reference to FIGS. 4 and 5, in forming the stator 14, a plurality of flexible, thermally conductive, carbon fiber-based insulation strips 62 are arranged within the respective slots 34 of the stator core 24. Specifically, each insulation strip 62 covers the facing side surfaces 46 of two adjacent teeth 30 and the inner surface 58 extending between the facing side surfaces 46, such that each insulation strip 62 is arranged between a pair of adjacent teeth 30.

Figure 8:
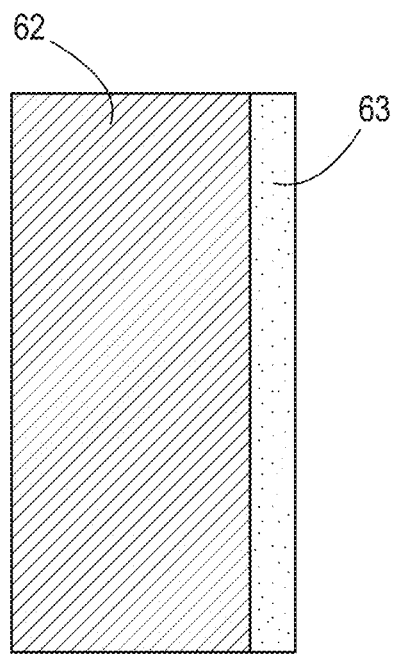
FIG. 8 is a cross-sectional view of an insulation strip of the stator of FIG. 2, according to an embodiment of the invention.
Figure 9:
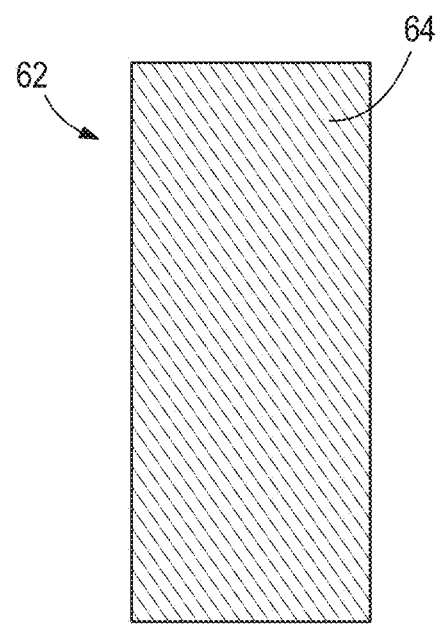
FIG. 9 is a cross-sectional view of an insulation strip of the stator of FIG. 2, according to an embodiment of the invention.
Figure 10:
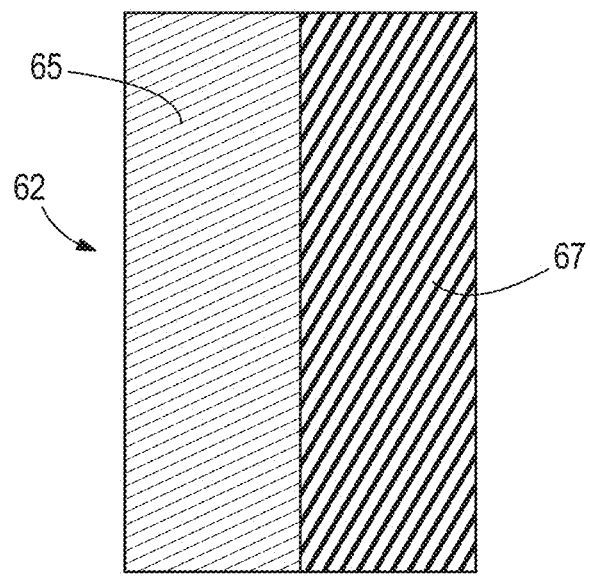
FIG. 10 is a cross-sectional view of an insulation strip of the stator of FIG. 2, according to an embodiment of the invention.

In some embodiments, such as the embodiment shown in FIG. 8, the insulation strips 62 include adhesive material 63 or an adhesive layer to adhere each of the insulation strips 62 to the inner surface 58 and the facing side surfaces 46 of two adjacent teeth 30. In some embodiments, such as the embodiment shown in FIG. 9, each of the insulation strips 62 is formed of a single layer 64 of material. In other embodiments, such as the embodiment shown in FIG. 10, each of the insulation strips 62 is formed of two layers of material, a first thermally conductive layer 65 and a second electrically insulating layer 67. In some embodiments, the color of the insulation strips 62 is black due to the presence of carbon fibers. The insulation strips 62 can be formed of different materials. Three such materials, and their respective characteristics, are shown in Table 1 Below.

TABLE 1

| Characteristic | Material 1 | Material 2 | Material 3 |
|---|---|---|---|
| Thickness (mm) | 3.00 +/− 10% | 2.00 +/− 10% | 1.00 +/− 10% |
| Bulk Thermal Conductivity (W/m − K)$^2$ | <10 | <10 | <10 |
| Thermal Impedance ((cm$^2$ − ° C.)/W) | >9 | >5 | >2.8 |
| Operating Temperature Range (° C.) | −40-120 | −40-120 | −40-120 |
| Dielectric Breakdown Voltage (V/mil) | Conducting | Conducting | PSA Insulation |
| Coefficient of Thermal Expansion (ppm/° C.) | 5-15 | 5-15 | 5-15 |
| Maximum Compression (%) | 40-50 | 40 | <20 |

For each of Materials 1-3, thermal impedance and compression percentage were measured at various pressures (measured in PSI), the results of which are show in Table 2 below.

TABLE 2

| Material | Characteristic | PSI = 5 | PSI = 15 | PSI = 30 | PSI = 50 |
|---|---|---|---|---|---|
| Material 1 | Thermal Impedance ((cm$^2$ − ° C.)/W) | 13.6 | 10 | 9 | NA |
|  | Compression (%) | 10 | 33 | 46 | NA |
| Material 2 | Thermal Impedance ((cm$^2$ − ° C.)/W) | 12 | 6 | 4.7 | NA |
|  | Compression (%) | 9 | 28 | 40 | NA |
| Material 3 | Thermal Impedance ((cm$^2$ − ° C.)/W) | 8.8 | 5.5 | 3.3 | 2.8 |
|  | Compression (%) | 2.5 | 6.7 | 17 | 21 |

For Material 3, thermal impedance and compression percentage were measured at various cycles, as shown in Table 3 below.

TABLE 3

| | Number of Cycles | | | |
|---|---|---|---|---|
| Characteristic | 50 | 100 | 150 | 200 |
| Thermal Impedance ((cm$^2$ − ° C.)/W) | 2.4 | 2.4 | 2.4 | 2.4 |
| Compression (%) | 27.5 | 30 | 33 | 33 |

Each of Materials 1-3 is commercially available from KULR Technology Group, Inc. of San Diego, Calif.

With reference to FIGS. 2, 4, and 5, a first insulation end cap 66 is formed of electrically insulating material (e.g., plastic) and is arranged to cover a first end of the stator core 24 and more specifically, the first end face 38 of the annular portion 26 and each of the first end surfaces 50 of the teeth 30. As shown in FIGS. 2 and 4, a second insulation end cap 70 is formed of electrically insulating material (e.g., plastic) and is arranged to cover an opposite, second end of the stator core 24 and more specifically, the second end face 42 of the annular portion 26, and each of the second end surfaces 54 of the teeth 30. In the illustrated embodiment, the first and second end caps 66, 70 each include a plurality of pairs of bookends 74 corresponding to the locations of the teeth 30. In some embodiments, there is no gap between either of the first or second end caps 66, 70, and the insulation strips 62, such that except for interior faces 78 of each tooth 30 and an exterior surface 82 of the annular portion 26, no portion of the stator core 24 is exposed.

With reference to FIG. 2, after the insulation strips 62 and first and second end caps 66, 70 have been assembled to the stator core 24, the windings 22 are wrapped around the respective teeth 30, thereby at least partially filling each of the slots 34. Thus, each winding 22 is wound around a first insulation strip 62 on one side surface 46 of the tooth 30, the first end cap 66 (between the bookends 74), a second insulation strip 62 on the other side surface 46 of the tooth 30, and the second end cap 70 (between the bookends 74). Because the teeth 30 are insulated, collectively, by the insulation strips 62 and the end caps 66, 70 where the respective windings 22 are wound, the windings 22 are electrically insulated from the stator core 24.

Figure 6:
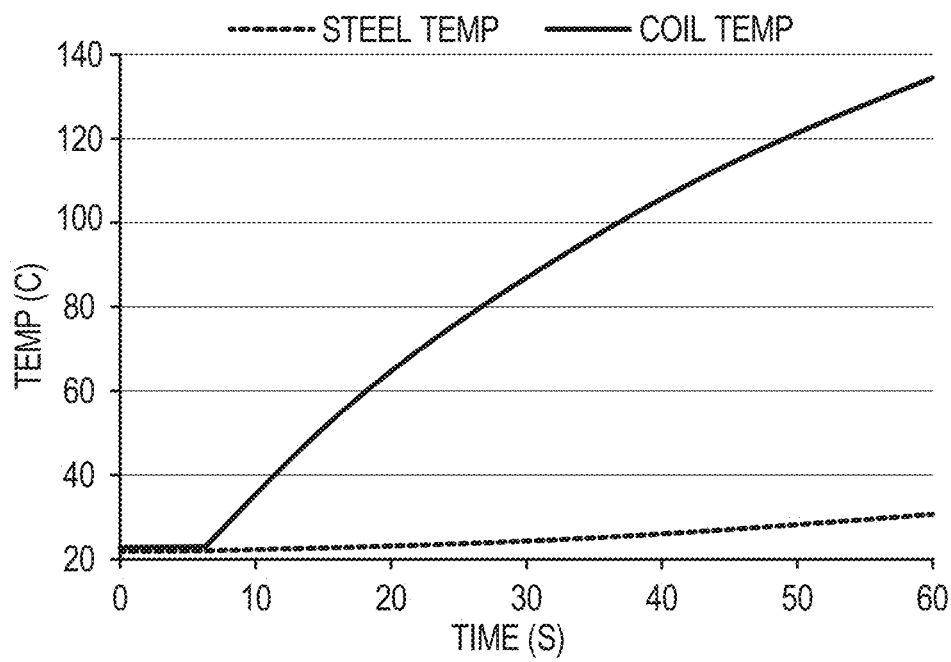
FIG. 6 is a graph showing test data using paper or cardboard as slot insulation with the stator of FIG. 2.

In operation, when the windings 22 of the stator 14 are supplied with current, electrical losses resulting from resistance generate heat, which is conducted though the insulation strips 62 and into the stator core 24 via the facing side surfaces 46 of adjacent teeth 30 and the inner surfaces 58 of the annular portion 26. By conducting heat from the windings 22 into the stator core 24, the stator core 24 functions as a heat sink that can draw heat away from other portions of the motor 10 (e.g., onboard electronics, etc.) and thereby improve the long-term performance and longevity of the motor 10. For instance, FIG. 6 illustrates a graph showing the temperatures of a stator core (formed of steel in this test) and the windings over a period of 60 seconds with 25 Amperes of current supplied through the windings, when, instead of thermally conductive, carbon fiber-based insulation strips 62, paper or cardboard is used as electrical insulation for the slots 34.

Figure 7:
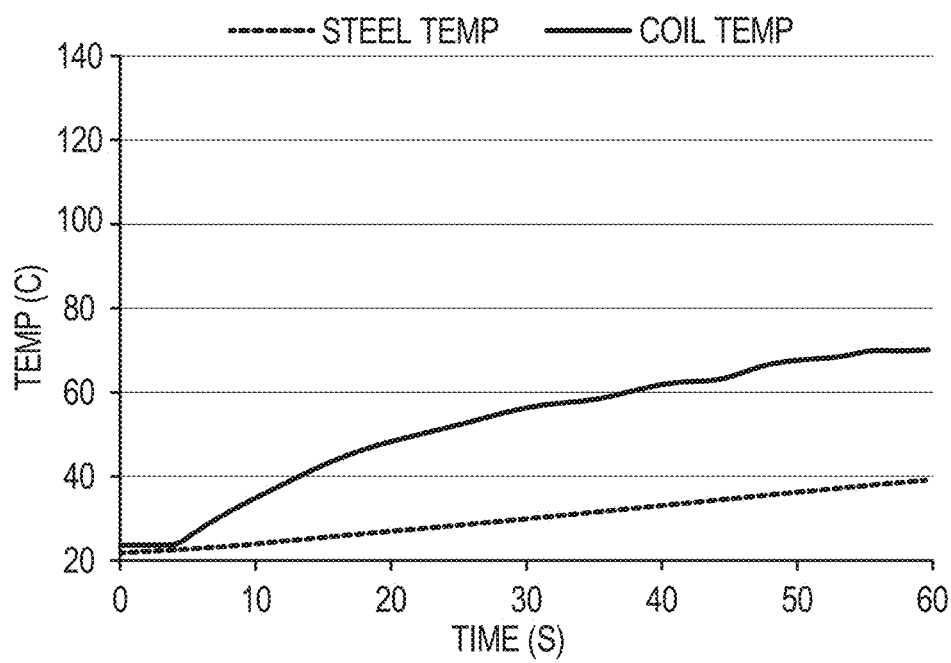
FIG. 7 is a graph showing test data using thermally conductive, carbon fiber-based insulation strips as slot insulation with the stator of FIG. 2.

In comparison, FIG. 7 illustrates a graph showing the temperatures of the stator core 24 (formed of steel in this test) and the windings 22 over a period of 60 seconds with 25 Amperes of current supplied through the windings 22, when the thermally conductive, carbon fiber-based insulation strips 62 are used as electrical insulation for the slots 34, as shown in the embodiment illustrated in FIGS. 2-5. In the graph shown in FIG. 7, the insulation strips 62 are multi-layer structures including a polymer (i.e., polyimide) layer for electrical insulation.

By using the thermally conductive, carbon fiber-based insulation strips 62 instead of paper or cardboard, after 60 seconds of runtime, the temperature of the stator core 24 is increased slightly, from approximately 30° Celsius (with paper or cardboard) to 40° Celsius (with the thermally conductive, carbon fiber-based insulation strips 62), because the insulation strips 62 conduct more heat from the windings 22 into the stator core 24. However, by using the thermally conductive, carbon fiber-based insulation strips 62 instead of paper or cardboard, after 60 seconds of runtime, the temperature of the windings 22 is reduced by nearly 50%, from approximately 137° Celsius (with paper or cardboard) to 70° Celsius (with the thermally conductive, carbon fiber-based insulation strips 62). Because heat from the windings 22 is more efficiently dissipated into the stator core 24 when the thermally conductive, carbon fiber-based insulation strips 62 are used, the overall temperature of the stator 14 is reduced, which can improve the long-term performance and longevity of the motor 10. Also, with the improved dissipation of heat from the windings 22, the motor 10 could be operated at a relatively high power level for longer periods of time. Or, the motor 10 could be operated at an intermediate or relatively low power levels while reducing the rate of cooling airflow (or eliminating cooling airflow altogether) over the stator 14.

Various features of the invention are set forth in the following claims.

What is claimed is:

1. A stator comprising:
a stator core including
an annular portion,
a plurality of teeth extending radially inward from the annular portion, such that a slot is defined between each pair of adjacent teeth, wherein each of the teeth includes a pair of side surfaces that face in opposite directions, and
a plurality of inner surfaces on the annular portion, each inner surface arranged between facing side surfaces of two adjacent teeth;
a plurality of thermally conductive, carbon fiber-based insulation strips, each insulation strip arranged within one of the slots for covering the inner surface and the facing side surfaces of two adjacent teeth; and
a plurality of windings wound around the respective teeth.

2. The stator of claim 1, further comprising a first insulation end cap adjacent a first end of the stator core and a second insulation end cap adjacent an opposite, second end of the stator core.

3. The stator of claim 2, wherein the first and second insulation end caps cover opposite ends of each of the plurality of teeth on the stator core, and wherein the insulation strips cover opposite side surfaces of the plurality of teeth such that the opposite ends of each of the teeth and an axial length of each of the teeth are covered, collectively, by the first and second insulation end caps and the insulation strips.

4. The stator of claim 1, wherein each of the insulation strips is formed of a first layer and a second layer.

5. The stator of claim 4, wherein the first layer is thermally conductive and the second layer is electrically insulating.

6. The stator of claim 1, wherein each of the insulation strips include an adhesive material configured to respectively adhere each of the insulation strips to the one of the inner surfaces and each of the side surfaces adjacent the respective inner surface.

7. The stator of claim 1, wherein each of the insulation strips is formed of one layer.

8. The stator of claim 1, wherein, in operation of the stator in which electrical current is directed through the windings at 25 amperes for a 60-second runtime, the insulation strips are configured to transfer heat from the windings and into the stator core to maintain the windings at a temperature of less than 80 degrees Celsius.

9. The stator of claim 8, wherein the carbon fiber-based insulation strips are electrically insulating.

10. The stator of claim 1, wherein the carbon fiber-based insulation strips are made of a material which has a bulk thermal conductivity of greater than 10 Watts per meter Kelvin.

11. The stator of claim 1, wherein the carbon fiber-based insulation strips are made of a material which has a coefficient of thermal expansion of between 5 and 15 parts per million per degree Celsius.

12. The stator of claim 1, wherein the carbon fiber-based insulation strips are made of a material which has a thermal impedance of greater than 2.4 degrees Celsius centimeters squared per Watt.

13. The stator of claim 12, wherein the carbon fiber-based insulation strips are made of a material which has a thermal impedance of greater than 5 degrees Celsius centimeters squared per Watt.

14. The stator of claim 13, wherein the carbon fiber-based insulation strips are made of a material which has a thermal impedance of greater than 9 degrees Celsius centimeters squared per Watt.

15. A stator comprising:
a stator core including
an annular portion,
a first tooth extending radially inward from the annular portion, the first tooth including a first side surface,
a second tooth extending radially inward from the annular portion, the second tooth including a second side surface, wherein a slot is defined between the first and second teeth, and
an inner surface arranged on the annular portion between the first and second side surfaces;
a thermally conductive, carbon fiber-based insulation strip within the slot for covering the inner surface, the first side surface, and the second side surface;
a first winding wound around the first tooth; and
a second winding wound around the second tooth.

16. The stator of claim 15, wherein the second tooth includes a third side surface facing an opposite direction of the second side surface, wherein the stator core includes a third tooth extending radially inward from the annular portion, the third tooth including a fourth side surface, wherein a second slot is defined between the second and third teeth, wherein the stator core includes a second inner surface arranged on the annular portion between the third and fourth side surfaces, wherein a second thermally conductive, carbon fiber-based insulation strip is within the second slot for covering the second inner surface, the third side surface, and the fourth side surface, and wherein a third winding is wound around the third tooth.

17. The stator of claim 16, further comprising a first insulation end cap adjacent a first end of the stator core and a second insulation end cap adjacent an opposite, second end of the stator core.

18. The stator of claim 17, wherein the first and second insulation end caps cover opposite ends of each of the first, second, and third teeth on the stator core, and wherein the first insulation strip covers the first and second side surfaces, and the second insulation strip covers the third and fourth side surfaces, such that the opposite ends of each of the first, second, and third teeth and an axial length of each of the first, second, and third teeth are covered, collectively, by the first and second insulation end caps and the first and second insulation strips.

19. The stator of claim 15, wherein the insulation strip is formed of one layer.

20. The stator of claim 15, wherein the insulation strip is formed of a first layer and a second layer.

21. The stator of claim 20, wherein the first layer is thermally conductive and the second layer is electrically insulating.

22. The stator of claim 15, wherein the insulation strip includes an adhesive material configured to adhere the insulation strip to the inner surface and each of the first and second side surfaces adjacent the inner surface.

23. The stator of claim 15, wherein, in operation of the stator in which electrical current is directed through the windings at 25 amperes for a 60-second runtime, the insulation strips are configured to transfer heat from the windings and into the stator core to maintain the windings at a temperature of less than 80 degrees Celsius.

24. The stator of claim 23, wherein the carbon fiber-based insulation strips are electrically insulating.

25. The stator of claim 24, wherein the carbon fiber-based insulation strips are electrically insulating.

26. The stator of claim 15, wherein the carbon fiber-based insulation strips are made of a material which has a bulk thermal conductivity of greater than 10 Watts per meter Kelvin.

27. The stator of claim 15, wherein the carbon fiber-based insulation strips are made of a material which has a coefficient of thermal expansion of between 5 and 15 parts per million per degree Celsius.

28. The stator of claim 15, wherein the carbon fiber-based insulation strips are made of a material which has a thermal impedance of greater than 2.4 degrees Celsius centimeters squared per Watt.

29. The stator of claim 28, wherein the carbon fiber-based insulation strips are made of a material which has a thermal impedance of greater than 5 degrees Celsius centimeters squared per Watt.

30. The stator of claim 29, wherein the carbon fiber-based insulation strips are made of a material which has a thermal impedance of greater than 9 degrees Celsius centimeters squared per Watt.

31. A stator comprising:
a stator core including
an annular portion,
a first tooth extending radially inward from the annular portion, the first tooth including a first side surface, a first end surface, and a second end surface opposite the first end surface,
a second tooth extending radially inward from the annular portion, the second tooth including a second side surface facing the first side surface of the first tooth, a third side surface facing an opposite direction as the second side surface, a first end surface, and a second end surface opposite the first end surface,
a third tooth extending radially inward from the annular portion, the third tooth including a fourth side surface facing the third side surface of the second tooth, a first end surface, and a second end surface opposite the first end surface,
a first inner surface arranged on the annular portion between the first and second side surfaces,
a second inner surface arranged on the annular portion between the third and fourth side surfaces;
a first thermally conductive, carbon fiber-based insulation strip covering the first side surface, the first inner surface, and the second side surface;
a second thermally conductive, carbon fiber-based insulation strip covering the third side surface, the second inner surface, and the fourth side surface;
a first insulation end cap configured to cover the first end surface of each of the first, second, and third teeth;
a second insulation end cap configured to cover the second end surface of each of the first, second, and third teeth; and
a winding wound around the second tooth, the winding contacting the first insulation strip, the first insulation end cap, the second insulation strip, and the second insulation end cap, such that the winding does not contact the second side surface, the first end surface of the second tooth, the third side surface, or the second end surface of the second tooth.

32. The stator of claim 31,
wherein the third tooth includes a fifth side surface facing an opposite direction as the fourth side surface,
wherein the stator core further includes
a fourth tooth extending radially inward from the annular portion, the fourth tooth including a sixth side surface facing the fifth side surface of the third tooth, a first end surface, and a second end surface opposite the first end surface, and
a third inner surface arranged on the annular portion between the fifth and sixth side surfaces,
wherein the first insulation end cap is configured to cover the first end surface of the fourth tooth,
wherein the second insulation end cap is configured to cover the second end surface of the fourth tooth, and
wherein the stator further comprises
a third thermally conductive, carbon fiber-based insulation strip covering the fifth side surface, the third inner surface, and the sixth side surface,
a second winding wound around the third tooth, the second winding contacting the second insulation strip, the first insulation end cap, the third insulation strip, and the second insulation end cap, such that the second winding does not contact the fourth side surface, the first end surface of the third tooth, the fifth side surface, or the second end surface of the third tooth.

33. The stator of claim 31, wherein the insulation strip is formed of one layer.

34. The stator of claim 31, wherein the insulation strip is formed of a first layer and a second layer.

35. The stator of claim 34, wherein the first layer is thermally conductive and the second layer is electrically insulating.

36. The stator of claim 31, wherein the insulation strip includes an adhesive material configured to adhere the insulation strip to the first side surface, the first inner surface, and the second side surface.

37. The stator of claim 31, wherein, in operation of the stator in which electrical current is directed through the windings at 25 amperes for a 60-second runtime, the insulation strips are configured to transfer heat from the windings and into the stator core to maintain the windings at a temperature of less than 80 degrees Celsius.

38. The stator of claim 31, wherein the carbon fiber-based insulation strips are made of a material which has a bulk thermal conductivity of greater than 10 Watts per meter Kelvin.

39. The stator of claim 31, wherein the carbon fiber-based insulation strips are made of a material which has a coefficient of thermal expansion of between 5 and 15 parts per million per degree Celsius.

40. A power tool comprising:
   a motor including a rotor and a stator, the stator including a stator core having
      an annular portion,
      a plurality of teeth extending radially inward from the annular portion, such that a slot is defined between each pair of adjacent teeth, wherein each of the teeth includes a pair of side surfaces that face in opposite directions, and
      a plurality of inner surfaces on the annular portion, each inner surface arranged between facing side surfaces of two adjacent teeth;
   a plurality of thermally conductive, carbon fiber-based insulation strips, each insulation strip arranged within one of the slots for covering the inner surface and the facing side surfaces of two adjacent teeth; and
   a plurality of windings wound around the respective teeth.

41. The power tool of claim 40, wherein the carbon fiber-based insulation strips are electrically insulating.

42. The power tool of claim 40, wherein, in operation of the motor in which electrical current is directed through the windings at 25 amperes for a 60-second runtime, the insulation strips are configured to transfer heat from the windings and into the stator core to maintain the windings at a temperature of less than 80 degrees Celsius.

* * * * *